United States Patent [19]

Nilsson

[11] 4,095,488
[45] Jun. 20, 1978

[54] PLANETARY GEAR SYSTEM

[75] Inventor: Sven Walter Nilsson, Partille, Sweden

[73] Assignee: SKF Nova AB, Gothenburg, Sweden

[21] Appl. No.: 674,642

[22] Filed: Apr. 7, 1976

[30] Foreign Application Priority Data

Jun. 4, 1975   Sweden ............................... 7506355

[51] Int. Cl.² ............................................. F16N 1/28
[52] U.S. Cl. ..................................................... 74/801
[58] Field of Search ................ 74/721, 798, 755, 801, 74/802, 803, 409, 410, 440, 206

[56] References Cited

U.S. PATENT DOCUMENTS

| | | | |
|---|---|---|---|
| 1,015,477 | 1/1912 | Conant | 74/801 |
| 1,688,194 | 10/1928 | Lyons | 74/802 |
| 3,083,031 | 3/1963 | Elwell | 74/409 |
| 3,548,673 | 12/1970 | Suchocki | 74/409 |

*Primary Examiner*—Samuel Feinberg
*Attorney, Agent, or Firm*—Eugene E. Renz, Jr.

[57] ABSTRACT

A planetary gear system comprising housing, an input shaft at one end and an output shaft at the opposite end and transmission means drivingly connecting the shafts to one another. The transmission means includes a planet support having at least two planet wheel journals mounted therein. At least one of the journals mounts a planet friction wheel adapted to contact a friction ring having at least an elastically deformable portion. Means is provided for adjusting the pressure applying relation between the planet friction wheel and the elastically deformable portion of the friction ring. This arrangement provides a multiple step gear system wherein the play in the system is minimized and the system operates at low noise levels.

8 Claims, 2 Drawing Figures

PLANETARY GEAR SYSTEM

BACKGROUND OF THE INVENTION

The present invention relates to a planetary gear system comprising a primary shaft, a propeller shaft, at least one intermediate shaft, a planet wheel support provided on at least one of said shafts, and at least two planet wheel journals on said planet wheel support.

It is previously known to provide planetary gears with a number of intermediate shafts so that the total gear ratio is achieved in two or more steps. Each intermediate shaft is thereby suitably provided with a planet wheel support with a number of planet wheel journals on which planet wheels are mounted, and a sun wheel. The planet wheels thereby co-operate with a sun wheel provided on an adjacent shaft, and the sun wheel co-operates with planet wheels provided on another adjacent shaft. By using two or more gear steps great total gear ratios can be achieved, but this is achieved at the cost of a comparatively long axial extension of the planetary gear system. Each intermediate shaft must, as well as the primary shaft and the propeller shaft, be provided with bearing and centering means, which together with the planet wheel supports and the sun wheels contribute to increase the necessary axial extension of the system. Another difficulty with multiple step gears is that possible gear plays can be added to an annoyingly great total play with running problems and noise troubles as a consequence.

SUMMARY OF THE INVENTION

The object of the present invention is therefore to provide a planetary gear system of the kind referred to in the introduction of the accompanying claim 1, which has a comparatively small axial extension, and in which the torque transmission takes place smoothly and silently independent of possible play in the gear wheels comprised in the system.

This is achieved according to the invention by giving the planetary gear system the characterizing features which are stated in the appended claims.

In a planetary gear system according to the invention the intermediate shafts do not have to be provided with special bearing and centering means, but the bearing and the centering take place by the torque transmitting devices which are comprised in the system. Further, the bending forces on the planet wheel journals caused by the gears which are comprised in the system can easily be taken up and be transmitted to the surrounding machine elements.

BRIEF DESCRIPTION OF FIGURES

A more detailed description of the invention will now be given with reference to the accompanying drawing, in which.

DESCRIPTION OF SPECIFIC EMBODIMENTS

Figure 1:
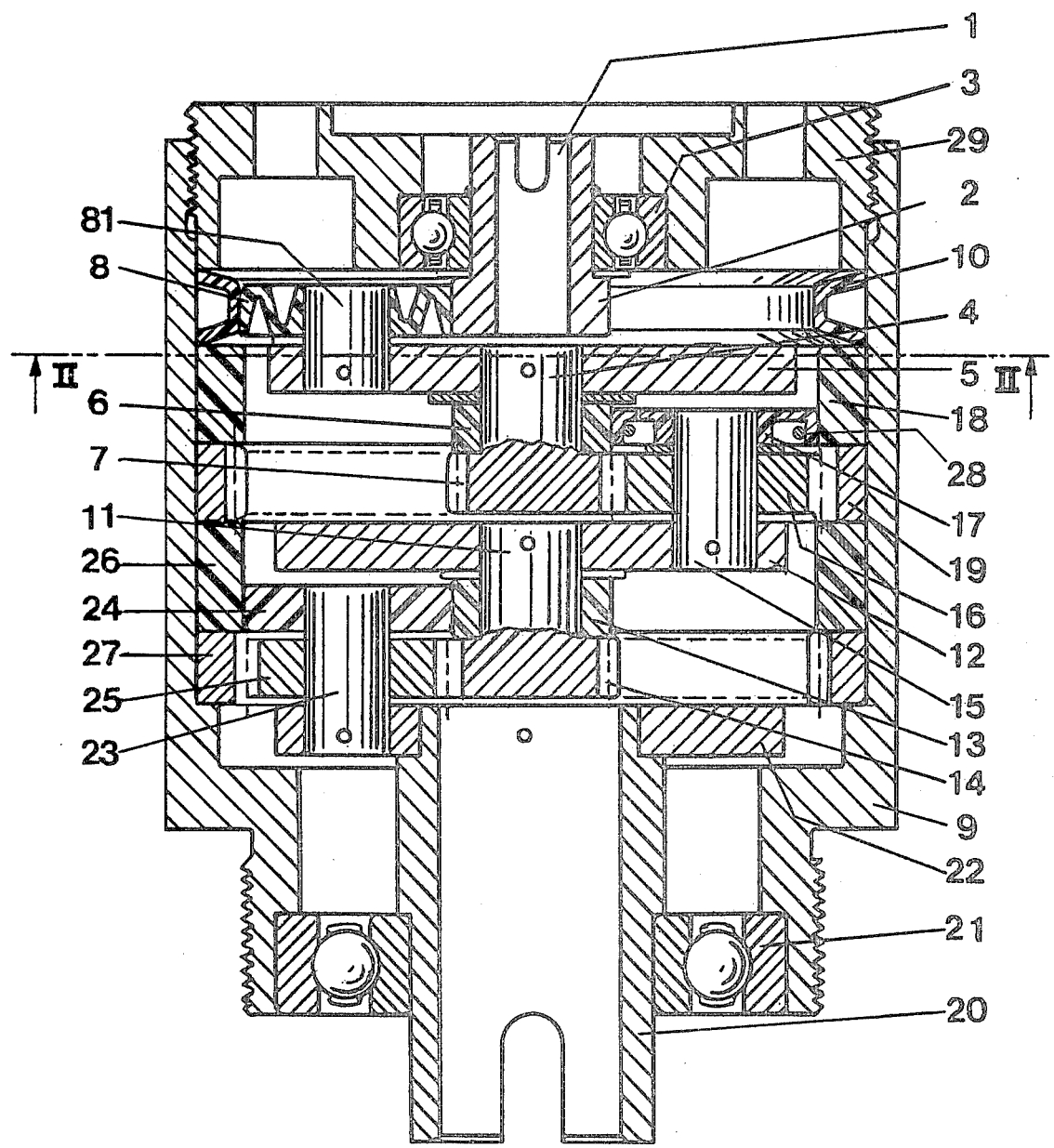
FIG. 1 shows a longitudinal section.

Reference numeral 1 indicates the primary shaft, which is provided with a friction sun wheel 2. The shaft is centered in the bearing 3. A first intermediate shaft 4 is rigidly connected to a planet wheel support 5, a friction sun wheel 6 and a sun gear wheel 7. On the support 5 three planet friction wheels 8 are mounted in bearings on planet wheel journals 18. The wheels 8 co-operated with the friction sun wheel 2 and with a friction ring 10, which is arranged around the inside of the housing 9. The shaft 1 thus drives the shaft 4 over the wheels 2 and 8 and the support 5.

Another intermediate shaft is indicated by the reference 11, on which shaft a planet wheel support 12, a friction sun wheel 13 and a sun gear wheel 14 are rigidly connected. Three planet wheel journals 15 are provided on the support 12, each of which journals being provided with a planet gear wheel 16 and a planet friction wheel 17. The wheels 17 co-operate with the wheel 6 and with a surrounding friction ring 18 corresponding to the ring 10, and the planet gear wheels 16 co-operate with the sun gear wheel 7 and a surrounding gear 19. The shaft 4 thus drives the shaft 11 over the wheels 6 and 17 and the support 12, and also over the wheels 7 and 16 and the support 12. The gear ratio over the wheels 6 and 17 is thereby equal to the gear ratio over the wheels 7 and 16, so that the wheels 6 and 17 have an equal periphery speed, which in its turn is equal to the periphery speed of the pitch circles of the gear wheels 7 and 16. Thereby no sliding takes place at the contact surfaces between the wheels 17 and the wheels 6 and the ring 18 respectively. A propeller shaft 20 mounted in the bearing 21 is in the same way as the shaft 11 provided with a planet wheel support 22, on which three planet wheel journals 23, provided with planet friction wheels 24 and planet gear wheels 25 are provided. The wheels 24 co-operate with the sun wheel 13, and a surrounding friction ring 26 in the same way as the wheels 17, the wheel 6 and the ring 18, and the gear wheels 25 co-operate with the sun gear wheel 14 and a surrounding gear 27 in the same way as the gear wheels 16, the gear wheel 7 and the gear wheel 19. The shaft 11 thus drives the shaft 20 in the same way as the shaft 4 drives the shaft 11.

In this gear system low torques are transmitted over the friction wheels 2, 6, 8, 13, 17 and 24, intermediate torques are transmitted over the friction wheels 2, 6, 8, and 17 and the gear wheels 14 and 25, and high torques are transmitted over the friction wheels 2 and 8 and the gear wheels 7, 14, 16 and 25.

At low torques the gear wheels are thus not transmitting any forces, which results in a smooth and silent running of the system. By the existence of friction wheels on the planet wheel journals the mesh in the gears is always retained, which prevents gear noise caused by gear play.

It is obviously not necessary to provide all the gear steps with gear wheels. In the embodiment described above, gear wheels are missing in the gear step which is closest to the shaft, which rotates with a higher angular speed than the propeller shaft because the torques in this position are comparatively small, while instead the angular speeds are comparatively high.

Since the planet friction wheels have to be pressed against the friction sun wheels and the surrounding friction rings with a certain force in order to be effective, they are suitably designed so that their circumference is elastically deformable, and they are suitably mounted with a certain prestress between the friction ring and the friction sun wheel. This can be achieved in different ways, for example, by making the wheels of an elastic material and possible giving them a shape which further improves the resiliency, for example, as shown by the wheel 8. It is also possible to provide the periphery of the wheels with a special elastic portion. For example, the wheels can be provided with a peripheral groove in which an O-ring of rubber is mounted. The wheel 17 has been given an alternative design, its periphery being pressed outwards by an elastic wire ring 28.

As a complement or an alternative to the elastic design of the planet friction wheels, the friction rings and/or the friction sun wheels can be designed so that their circumferences are elastically deformable. The sun wheels can thereby be designed in the same way as the planet wheel. It is possible to provide for an adjustable pre-stressing between the friction ring and the planet wheels if the ring is shaped, for example, as the ring 10. This ring has a section area which is shaped like a U with diverging flanges. The flanges are tightened between the ring 18 and an axially displaceable lid 29. When the lid is screwed into the end bore of the house 9, the flanges of the ring are pressed together and its unloaded bore diameter decreases. Adjustment of the position of the lid 29 in the house is possbile because the wheel 2 which is mounted in bearings in the lid 29, can be permitted a certain axial displacement in relation to the wheels 8. It is, of course, also possible to provide special tightening means at each friction ring in order to make dimension adjustment possible if such a design is considered to be preferable.

When a torque is transmitted through the gear via the gear wheels 7, 16, 19 and 14. 25, 27, respectively, the journals 15 and 23, respectively, are subjected to great bending forces. These forces can be taken up in a device according to the invention by the planet friction wheels and be transmitted to the friction rings 18, 26 and to the house 9, respectively, if the planet gear wheels are provided on the planet wheel journals in the axial position between the planet supports and the planet friction wheels, as shown in the drawing.

Figure 2:
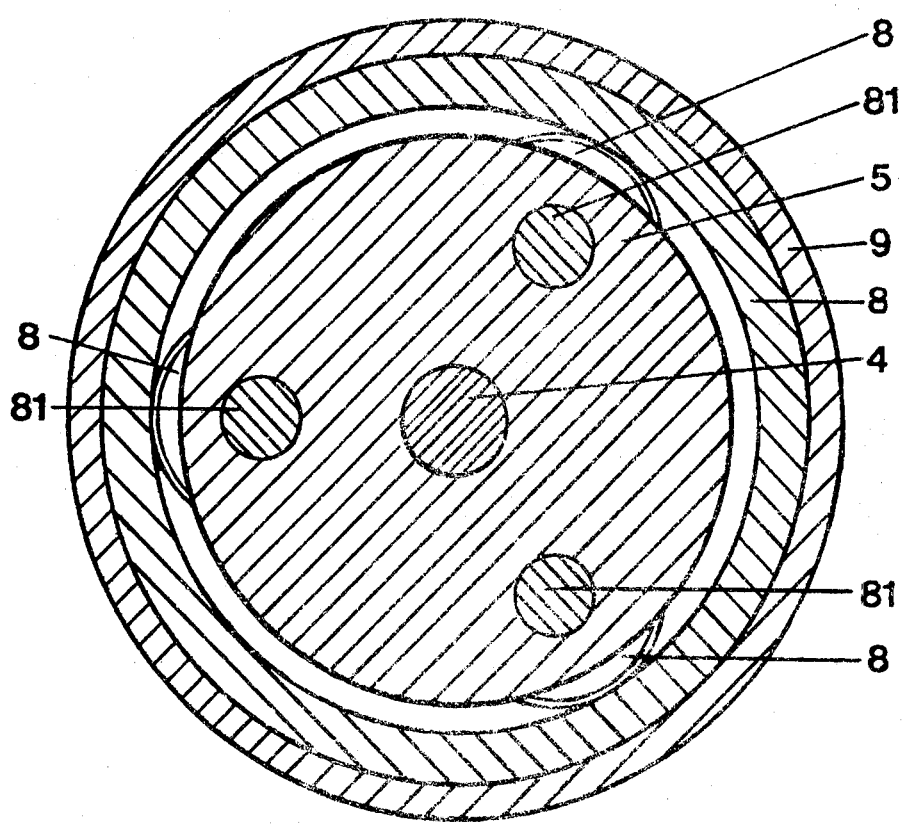
FIG. 2 a section according to line II—II in FIG. 1 of one embodiment of the invention.

The friction sun wheels, the friction rings and the planet friction wheels are suitably also acting as centering and bearing means for the intermediate shafts 4, 11. It is theoretically possible to achieve a centering and bearing function by providing the planet supports on the intermediate shafts with two planet friction wheels each. In practice, however, it is always necessary to provide the planet supports with three planet friction wheels each, as shown in FIG. 2. It has been proved that with such a design, further centering and bearing means for the intermediate shafts are unnecessary.

Also other embodiments of the invention than the above described are of course possible within the scope of the claims.

The number of intermediate shafts can, for example, be arbitrary, even if one or two are the most common numbers. The number of gear steps without gear wheels are, of course, depending on the torques transmitted through each step. It may thus, sometimes, be necessary to provide all the steps with gear wheels, and sometimes, gear wheels can be dispensed within several steps. The gear system can be used both for gearing up and gearing down, and it is thus possible, if desired, to change the references to primary shaft and propeller shaft in the embodiment shown. It is also possible to mount the planet friction wheels and the planet gear wheels on different journals.

I claim :

1. A planetary gear system comprising a housing, an input shaft at one end of said housing and an output shaft at the other end thereof, transmission means drivingly connecting said shafts including, a planet support having at least two planet wheel journals mounted thereon, at least one of said journals mounting a planet friction wheel adapted to contact a friction ring having at least an elastically deformable portion mounted in said housing, and means for adjusting the pressure applying relation between said planet friction wheel and said elastically deformable portion of said friction ring.

2. Planetary gear system according to claim 1, in which at least two shafts are provided with planet supports, characterized by that the planet support which is situated closest to that one of the primary and the propeller shaft which rotates faster, is not provided with gear wheels.

3. Planetary gear system according to claim 1, characterized by that the planet gear wheel is provided on the same planet wheel journal as a planet friction wheel and is situated in axial direction between the planet support and the planet friction wheel.

4. A planetary gear system as claimed in claim 1 wherein said transmission means includes a first intermediate shaft connected to said planet support and a sun gear on said first intermediate shaft, at least one of the planet wheel journals mounting a planet gear wheel in meshing engagement with said sun gear and a surrounding gear mounted in the housing.

5. A planetary gear system as claimed in claim 1 wherein said friction ring is of U-shaped cross section have radially directed outwardly divergent flanges and including means for selectively pressing the flanges together axially to adjust the pressure applying relation between said friction ring and said planet friction wheels.

6. A planetary gear system as claimed in claim 1 wherein said planet friction wheel has a flexible peripheral flange portion engaging said friction ring and said means for adjusting the pressure applying relation consists of an elastic expansion ring member engaging interiorly of said flange portion and pressing it radially outwardly.

7. A planetary gear system comprising a primary shaft, a propeller shaft, a planet support, and at least two planet wheel journals each being provided with a planet friction wheel, which wheels are contacting a surrounding friction ring and a friction sun wheel provided on an adjacent shaft, and at least one of the planet wheel journals being provided with a planet gear wheel which cooperates with a surrounding gear and a sun gear provided on the adjacent shaft, characterized by that the friction ring is elastically deformable and that the system comprises means for adjusting the bore diameter of the friction ring.

8. A planetary gear system according to claim 7, characterized by that the section area of the friction ring is shaped like an U with diverging flanges, and by means for adjustably axially tightening of said flanges.

* * * * *